United States Patent [19]

Ueno et al.

[11] 4,356,203

[45] Oct. 26, 1982

[54] PROCESS FOR PRODUCING CURED MEAT PRODUCTS HAVING ANTIBOTULINAL ACTIVITY

[75] Inventors: Ryuzo Ueno, Nishinomiya; Toshio Matsuda, Itami; Tatsuo Kanayama, Takarazuka; Kunihiko Tomiyasu; Yatsuka Fujita, both of Nishinomiya; Kiyoshi Nagata, Takarazuka, all of Japan

[73] Assignee: Kabushiki Kaisha Ueno Seiyako Oyo Kenkyujo, Osaka, Japan

[21] Appl. No.: 312,817

[22] Filed: Oct. 19, 1981

Related U.S. Application Data

[63] Continuation of Ser. No. 144,877, Apr. 29, 1980, abandoned.

[51] Int. Cl.$^3$ .......................... A23B 4/02; A23B 4/12
[52] U.S. Cl. .................................. 426/266; 426/281; 426/332; 426/641; 426/652
[58] Field of Search ............... 426/264, 265, 266, 281, 426/331, 332, 335, 641, 652

[56] References Cited

U.S. PATENT DOCUMENTS

| | | | |
|---|---|---|---|
| 3,154,423 | 10/1964 | Voegeli et al. | 426/265 |
| 3,258,345 | 6/1966 | Schack et al. | 426/266 |
| 3,386,836 | 6/1968 | Borenstein et al. | 426/265 X |
| 3,989,851 | 11/1976 | Hawley et al. | 426/641 X |

FOREIGN PATENT DOCUMENTS 1245227  9/1971  United Kingdom ................ 426/265

OTHER PUBLICATIONS

Hendrickson et al., "Sodium Ascorbate in Stabilizing Cured Meat Color", *Food Technology*, 10-56, pp. 500-502, 426-652.

*Primary Examiner*—Arthur L. Corbin
*Attorney, Agent, or Firm*—Sherman & Shalloway

[57] ABSTRACT

A process for producing meat cured products having antibotulinal activity, which comprises separately adding to meat ascorbic acid or its salt and/or erythorbic acid or its salt in the form of a powder or aqueous solution and (B) a nitrite salt in the form of a powder or aqueous solution.

5 Claims, No Drawings

PROCESS FOR PRODUCING CURED MEAT PRODUCTS HAVING ANTIBOTULINAL ACTIVITY

This is a continuation of application Ser. No. 144,877, filed Apr. 29, 1980 now abandoned.

This invention relates to a novel process for producing safe meat products.

Generally, a curing agent composed mainly of sodium chloride and a nitrite salt (sodium or potassium nitrite) is added to meat products such as ham, bacon and sausage in order to inhibit growth of bacteria which cause food poisoning, to stabilize the color of meat (fix its pink color), to impart a unique flavor to cured meat and to retard spoilage. Such a curing agent is added in various ways, for example by adding a powdery curing agent directly to meat, by preparing an aqueous solution of the curing agent and injecting it into meat, or by dipping meat in such a pickle solution.

From the standpoint of sanitation, the antibotulinal activity of the nitrite is most important among its various activities. In the absence of the nitrite, the growth of *Clostridium botulinum* which contaminates meat cannot be inhibited, and it is extremely likely that botulinal toxin produced by this bacterium, will cause food poisoning. It is important therefore to avoid a risk of food poisoning by using nitrite salts, and for example, in the United States, the use of sodium nitrite in an amount of as large as 120 ppm or 156 ppm is permitted.

Recent works have shown however that nitrite radicals ($NO_2^-$) formed by the decomposition of the nitrite in meat react with basic secondary amines as a component of the meat to form N-nitrosoamines. It is known that this reaction takes place particularly when the meat product is heated to a high temperature of, say, 150° to 170° C., and nitrite radicals ($NO_2^-$) particularly react with L-proline to form N-nitrosopyrrolidine (see, for example, Crosby et al., "Nature", vol. 238, page 342, 1972, London). N-nitrosoamine is an extremely strong carcinogenous substance. It is very important to avoid exposure of human bodies to this substance, and much research work has been done to develop methods for avoiding such a risk. One method currently in use comprises using ascorbic acid or its salt or erythorbic acid (also called d-erythoro-ascorbic acid) or its salt together with the nitrite so as to reduce the formation of N-nitrosopyrrolidine. In United States, the food industry is legally obligated to add ascorbic acid or its salt and/or erythorbic acid or its salt where the nitrite is used. For example, in the production of bacon in United States, curing is performed by injecting into meat lumps a curing agent prepared by dissolving a nitrite salt and sodium erythorbate or sodium ascorbate in an aqueous solution containing sodium chloride and a polyphosphate salt.

The present inventors doubted, however, whether erythorbic acid (or its salt) or ascorbic acid (or its salt) would be able to remain stable in the presence of the nitrite as in the aforesaid practice in United States. Thus, they prepared such pickle solutions and examined them for the extent of decomposition of erythorbic acid or ascorbic acid therein. Surprisingly, they found that the decomposition of erythorbic acid or ascorbic acid was more than expected, as shown in Experimental Example 1 shown hereinbelow, and the effect of erythorbic acid or ascorbic acid in such pickle solutions was markedly impaired.

When a mixed solution of sodium erythorbate and sodium nitrite was examined by the rec-assay, which is one of mutagenicity tests, "positive" results were obtained as will be described hereinbelow. This fact shows that not only does erythorbic acid lose its effect as a result of decomposition by the nitrite, but also mutagen form. Hence, according to the conventional practice, the effect of erythorbic acid or ascorbic acid cannot be fully exhibited.

The present inventors made extensive investigations in order to obtain sufficient effects of erythorbic acid or ascorbic acid, and finally reached the process of this invention.

According to this invention, there is provided a process for producing meat products, which comprises separately adding to meat (A) erythorbic acid or its salt and/or ascorbic acid or its salt in the form of a powder or aqueous solution and (B) a nitrite salt in the form of a powder or aqueous solution.

The process of this invention is suitably applied to the production of meat products such as bacon, ham and sausage, which includes a curing step. In curing, sodium chloride and additives usually employed for curing, such as polyphosphate salts and sugars, are used. These additives can be added together with (A) or (B).

The sequence of adding (A) erythorbic acid (or its salt) or ascorbic acid (or its salt) containing the aforesaid additives, and (B) the nitrite is optional. When meat lump is used as a starting meat especially for production of ham and bacon, a method of injecting an aqueous solution (pickle solution) of (A) or (B) is frequently used in order to distribute the additives uniformly in the meat lump. The addition may also be effected by dipping the meat lump in such an aqueous solution, or by rubbing the powder of (A) or (B) into the meat lump from its surface. These methods of addition can be combined in any desired way so long as (A) and (B) are added separately. One example of the method of addition comprises injecting a pickle solution (A) containing erythorbic acid (or its salt) or ascorbic acid (or its salt) into meat lump, and dipping the meat lump in a pickle solution (B) containing a nitrite salt or rubbing a powdery mixture (dry salting agent) (B) containing the nitrite salt into the meat lump thereby to infiltrate or penetrate the nitrite into the meat lump. Or this method may be performed in a reverse order.

In the production of sausage for example, (A) and (B) may be added in the above manner to meat lump, or it is also possible to add one of (A) or (B) to meat lump in the manner mentioned above and then add the other while mincing the resulting meat lump or preparing a meat emulsion from the meat lump. Preferably, meat lump is dipped in an aqueous solution containing the nitrite for 1 to 3 days, and when preparing a meat emulsion therefrom, powdery erythorbic acid (or its salt) or ascorbic acid (or its salt) is added.

In the case of the injecting method, the total amount of the pickle solutions injected is generally about 5 to 30%, preferably about 10 to 20%, based on the weight of meat. When (A) and (B) are to be injected separately as aqueous solutions, the amount of one of the solutions may be the same as, or different from, that of the other, and generally 5 to 15% of the pickle solution (A) and 15 to 5% of the pickle solution (B) are injected. The concentrations of the additives in the salting solution are determined depending upon the target amounts of the individual additives added to meat and the amount of the pickle solution injected.

For example, in the production of bacon, the total amount of a pickle solution injected is generally 10 to 20%, and the pickle solution contains 1 to 1.5% of sodium chloride, 0.1 to 0.2% of sodium tripolyphosphate, 0 to 0.5% of sugar, 40 to 120 ppm of sodium nitrite and 300 to 600 ppm of sodium erythorbate (or sodium ascorbate) dissolved therein based on the weight of meat. In accordance with this invention, this pickle solution is divided into (A) containing sodium erythorbate and (B) containing sodium nitrite [the additives are distributed arbitrarily to the solutions (A) and (B)], and are separately injected into meat lump. In the dipping method or rub-in method, the concentration of the dipping solution, the dipping time or the amount of (A) or (B) used in the rub-in method for adding the target amounts of (A) and (B) in meat can be easily determined by conducting preliminary experiments.

Sodium erythorbate is preferred as the erythorbic acid salt, and sodium ascorbate is preferred as the ascorbic acid salt. Examples of the nitrite are potassium nitrite and sodium nitrite. The preferred amounts of erythorbic acid (or its salt) or ascorbic acid (or its salt) and the nitrite to be added to meat (the target amounts) are 300 to 600 ppm as sodium erythorbate or sodium ascorbate and 20 to 120 ppm as sodium nitrite. The other additives are used in usual amounts.

The characteristic feature of the present invention lies in the fact that by adding erythorbic acid or its salt or ascorbic acid or its salt, and a nitrite salt separately to meat, the decomposition of the erythorbic acid or ascorbic acid by the nitrite and the formation of mutagen can be prevented. These additives incorporated separately in meat naturally penetrate into the entire meat and meet with each other in the meat. However, since the meeting occurs in a system which contains large amounts of proteins, myoglobin and other meat components for the amounts of these additives, the nitrite reacts with proteins or myoglobin rather than with erythorbic acid, ascorbic acid or the salts of these. This naturally results in the reduction of the action of the nitrite on erythorbic acid, ascorbic acid or the salts thereof.

Thus, the present invention offers a process for producing meat products by a very safe expedient, as can also be seen from Examples given hereinbelow. The resulting meat products are quite equivalent to those obtained by conventional methods in various qualities and anti-botulinal activity.

The following Experimental Examples and Example specifically illustrate the present invention. In these examples, all percentages are by weight.

EXPERIMENTAL EXAMPLE 1

The stability of sodium erythorbate (NaEry) and sodium ascorbate (NaAsA) in the presence of a nitrite (NaNO$_2$) was investigated.

The content of sodium erythorbate or sodium ascorbate was periodically measured at 0° C. and 18° C. respectively by a 2,6-dichloroindophenol method using test solutions containing sodium nitrite (Nos. 1 and 3) and test solutions not containing sodium nitrite (Nos. 2 and 4). The results are shown in Table 1.

It is seen from the results obtained that the content of sodium erythorbate or sodium ascorbate decreases greatly in the presence of the nitrite.

TABLE 1

| Test solution | Concentrations of additives (%) | | | | | Measured values (mg/100g) | | | | | |
|---|---|---|---|---|---|---|---|---|---|---|---|
| | NaCl | Sodium tripoly-phosphate | NaNo$_2$ | NaEry | NaAsA | 20 minutes after preparation | | 6 hours after preparation | | 24 hours after preparation | |
| | | | | | | 0° C. | 18° C. | 0° C. | 18° C. | 0° C. | 18° C. |
| No. 1 | 15 | 2 | 0.04 | 0.55 | — | 44 | 31 | 33 | 28 | 26 | 18 |
| No. 2 | 15 | 2 | — | 0.55 | — | 554 | 537 | 550 | 518 | 544 | 496 |
| No. 3 | 15 | 2 | 0.04 | — | 0.55 | 40 | 33 | 34 | 27 | 20 | 17 |
| No. 4 | 15 | 2 | — | — | 0.55 | 549 | 530 | 553 | 520 | 536 | 509 |

EXPERIMENTAL EXAMPLE 2

A pickle solution containing 15% of sodium chloride, 2% of sodium tripolyphosphate and 400 ppm of sodium nitrite (NaNO$_2$), a pickle solution containing 15% of sodium chloride, 2% of sodium tripolyphosphate and 5500 ppm of sodium erythorbate (NaEry), and a pickle solution containing 15% of sodium chloride, 2% of sodium tripolyphosphate, 400 ppm of sodium nitrite (NaNO$_2$) and 5500 ppm of sodium erythorbate (NaEry) were prepared. Since the pickle solutions are normally injected in an amount of 10% based on the weight of meat, the concentrations of the individual additives in the solutions were ten times as large as those usually added to meat.

Each of these pickle solutions was maintained at 3° C. for 20 hours, and extracted twice with ethyl ether. The ethereal layers were collected and washed twice with water. Then, the ether was removed by distillation under reduced pressure. The residue was dissolved in 5 ml of ethyl ether. The resulting solution was impregnated into a disc, and subjected to the rec-assay by a modified method of Hirano et al. involving using spores of *Bacillus subtilis* H-17 (Rec+) and M-45 (Rec−) strains. In the rec-assay, N-methyl-N'-nitro-N-nitrosoguanidine was used as a positive control and kanamycin as a negative control, each in a concentration of 10 μg in the disc. The results of the rec-assay are shown in Table 2.

It is seen from Table 2 that when sodium nitrite and sodium erythorbate are placed together for a long period of time, the result of the rec-assay is positive. Although the degree of this positive result is much weaker than that of N-methyl-N'-nitro-N-nitroguanidine used as a positive control, it suggests the formation of an ether-extractable rec-assay positive substance.

It is seen from the results that in order to provide safe meat products by avoiding the formation of mutagen, it is necessary to avoid direct contact between the erythorbate and the nitrite and to add them separately to meat.

TABLE 2

| Concentrations of the additives in the pickle solution | (Rec+) Diameter of an inhibitory zone (mm) | (Rec−) Diameter of an inhibitory zone (mm) | (Rec−) − (Rec+) |
|---|---|---|---|
| NaNO$_2$    400 ppm | 0 | 0 | 0 |
| NaEry       5500 ppm | 0 | 0 | 0 |
| NaNO$_2$    400 ppm<br>NaEry       5500 ppm | 0 | 8.9 | 8.9* |
| Positive control | 2.1 | 23.7 | 21.6* |
| Negative control | 8.6 | 9.4 | 0.8 |
| Ethyl ether | 0 | 0 | 0 |

*The asterisked figures mean positiveness.

EXAMPLE

Bacon was produced using 4 kg of pork belly (about 30×50×4–7 cm).

Curing agents were used by injecting one pickle solution or two pickle solutions (solutions A and B). The total amount of the pickle solution was 10% based on the weight of meat. When two pickle solutions were used, they were injected each in an amount of 5% separately to meat (first the solution A and then the solution B).

The amount of the pickle solution injected and the concentrations of the additives in the pickle solution in each run are shown in Table 3.

The parenthesized figures in Table 3 represent percentages of the additives added by the injection of the pickle solution. As is seen from Table 3, when one pickle solution was used (Runs Nos. 1, 2 and 5), its amount injected was 10% based on the weight of meat. Hence, the concentrations of the individual additives in the pickle solution are ten times the amounts of the additives added to meat (the parenthesized figures). When two pickle solutions were used (Runs Nos. 3, 4 and 6), they were separately injected each in an amount of 5%. Hence, the concentrations of the individual additives in each pickle solution are 20 times the amounts of the additives added to meat (the parenthesized figures).

The meat lump into which the pickle solution had been injected was allowed to stand overnight in a refrigerator at 0° to 2° C. to cure it. Then, it was dried at 30° to 50° C. for 3 hours, smoked at 70° C. for 5 hours, and cooled to produce bacon.

The bacon obtained was sliced to a thickness of 2.5 to 3.0 mm by means of a ham slicer sterilized and disinfected by 70% alcohol. Samples were chosen at random from the bacon slices and subjected to the following tests.

Determination of a nitrite radical (NO$_2^-$)

The slice samples were fried on both surfaces at 171° C. using a portable Teflon-coated electric frying pan for 3 minutes. The NO$_2^-$ contents of the slice samples before and after frying were determined by the method (Shinn method) described at page 194 of a Japanese-language publication entitled "Commentary of Hydienic Inspecting Methods" edited by the Japanese Pharmaceutical Society.

Determination of N-nitrosopyrrolidine

Slice samples of bacon fried under the aforesaid conditions were analyzed by the Fine et al. vacuum distillation method and a gas-chromatographic-thermal energy-analyzer (Anal. Chem. Acta., vol. 78, page 383, 1975).

The results are summarized in Table 4.

It is seen from Tables 3 and 4 that in Runs Nos. 3, 4 and 6 in accordance with this invention, a decrease in the amount of N-nitrosopyrrolidine formed and a decrease in the amount of residual NO$_2^-$ after frying were noted in comparison with Runs Nos. 1, 2 and 5, respectively, which were conducted in accordance with the conventional practice (injection at one time).

TABLE 3

| Run No. | Amount of the pickle solution injected (%) | NaCl | Polyphosphate | NaNO$_2$ | NaEry | NaAsA | Remarks |
|---|---|---|---|---|---|---|---|
| 1 | 10 | 15<br>(1.5) | 2<br>(0.2) | 0.12<br>(0.012) | 0.55<br>(0.055) | — | — |
| 2 | 10 | 15<br>(1.5) | 2<br>(0.2) | 0.04<br>(0.004) | 0.55<br>(0.055) | — | — |
| 3 | 5 | 15<br>(0.75) | 4<br>(0.2) | 0.24<br>(0.012) | — | — | Solution A |
|   | 5 | 15<br>(0.75) | — | — | 1.1<br>(0.055) | — | Solution B |
| 4 | 5 | 15<br>(0.75) | 4<br>(0.2) | 0.08<br>(0.004) | — | — | Solution A |
|   | 5 | 15<br>(0.75) | — | — | 1.1<br>(0.055) | — | Solution B |
| 5 | 10 | 15<br>(1.5) | 2<br>(0.2) | 0.04<br>(0.004) | — | 0.55<br>(0.055) | — |
| 6 | 5 | 15<br>(0.75) | 4<br>(0.2) | 0.08<br>(0.004) | — | — | Solution A |
|   | 5 | 15<br>(0.75) | — | — | 1.1<br>(0.055) | — | Solution B |

TABLE 4

| Run No. | Residual NO$_2^-$ (ppm) Before frying | Residual NO$_2^-$ (ppm) After frying | N—nitrosopyrrolidine (ppb) |
|---|---|---|---|
| 1 | 44.1 | 6.0 | 6.3 |
| 2 | 14.3 | 2.1 | 2.6 |
| 3 | 42.2 | 5.1 | 5.4 |
| 4 | 14.0 | 1.7 | 2.0 |
| 5 | 14.2 | 2.2 | 2.5 |
| 6 | 14.2 | 1.7 | 1.9 |

What we claim is:

1. A process for producing cured meat products having antibotulinal activity comprising curing meat with a pickling composition comprising curing agents consisting essentially of sodium chloride, from 20 to 120 ppm, based on the weight of the meat, of a nitrite salt, and a polyphosphate salt curing agent, and an additive for reducing formation of N-nitrosopyrrolidine consisting essentially of from 300 to 600 ppm of at least one of ascorbic acid or its salt and erythorbic acid or its salt, wherein said pickling composition is divided into a first preparation containing all of the nitrite salt and a second preparation containing all of said additive, said first and second preparations being separately added to the meat under conditions such that the nitrite salt reacts with protein or myoglobin in the meat but does not react with the additive, whereby decomposition of the additive, due to reaction with the nitrite salt, and formation of mutagenic substances, are prevented.

2. The process of claim 1 which comprises first adding the first preparation to the meat and then adding the second preparation to the meat.

3. The process of claim 1 or 2 wherein each of said first preparation and second preparation are in the form of aqueous solutions containing the nitrite salt and additive, respectively, and wherein the nitrite salt and the additive are separately added to the meat product by separately injecting the first preparation and second preparation into the meat product.

4. The process of claim 1 or 2 wherein each of said first preparation and second preparation are in the form of aqueous solutions containing the nitrite salt and the additive, respectively, and wherein the nitrite salt and the additive are added to the meat product by separately dipping the meat product into the first preparation and the second preparation.

5. The process of claim 1 or 2 wherein each of the first preparation and second preparation are in the form of powders containing the nitrite salt and the additive, respectively, and wherein the nitrite salt and the additive are separately added to the meat product by separately rubbing each of said first preparation and second preparation into the meat product from its surface.

* * * * *

UNITED STATES PATENT AND TRADEMARK OFFICE
CERTIFICATE OF CORRECTION

PATENT NO. : 4,356,203
DATED : October 26, 1982
INVENTOR(S) : Ryuzo Ueno et al.

It is certified that error appears in the above-identified patent and that said Letters Patent is hereby corrected as shown below:

On the title page, assignee should read

-- Kabushiki Kaisha Ueno Seiyaku Oyo Kenkyujo --.

Signed and Sealed this

Twenty-ninth Day of March 1983

[SEAL]

Attest:

GERALD J. MOSSINGHOFF

Attesting Officer

Commissioner of Patents and Trademarks